US012393451B2

(12) United States Patent
Sarkar et al.

(10) Patent No.: US 12,393,451 B2
(45) Date of Patent: Aug. 19, 2025

(54) SYSTEMS AND METHODS FOR DYNAMIC TASK SCHEDULING AND RESCHEDULING USING HETEROGENEOUS MULTI-AGENT FLEET

(71) Applicant: Tata Consultancy Services Limited, Mumbai (IN)

(72) Inventors: Chayan Sarkar, Kolkata (IN); Ruchira Singh, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 602 days.

(21) Appl. No.: 17/810,162

(22) Filed: Jun. 30, 2022

(65) Prior Publication Data

US 2023/0071370 A1    Mar. 9, 2023

(30) Foreign Application Priority Data

Jul. 27, 2021    (IN) .............................. 202121033790

(51) Int. Cl.
*G06F 9/48* (2006.01)
*G06F 9/50* (2006.01)

(52) U.S. Cl.
CPC .............. *G06F 9/4887* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4887; G06F 9/50; G06F 9/5005; G06F 9/5027; G06F 9/5038
See application file for complete search history.

(56) References Cited

U.S. PATENT DOCUMENTS 8,302,097 B2   10/2012   Buco et al.
10,948,926 B2   3/2021   Sarkar et al.
(Continued)

FOREIGN PATENT DOCUMENTS

JP    2020149675 A    9/2020

OTHER PUBLICATIONS

Agrawal et al, "Cannot avoid penalty for fluctuating order arrival rate? Let's minimize", 2019 IEEE/RSJ International Conference on Intelligent Robots and Systems (IROS), Macau, China, Nov. 4-8, 2019, pp. 7386-7393 (Year: 2019).*
(Continued)

*Primary Examiner* — Charles M Swift
(74) *Attorney, Agent, or Firm* — Finnegan, Henderson, Farabow, Garrett & Dunner, LLP

(57) ABSTRACT

This disclosure relates generally to system and methods for dynamic scheduling and rescheduling using heterogeneous multi-agent fleet. The embodiments of present disclosure herein address unresolved problem of task allocation using a single solution which is not sufficient for handling various scenarios of multi-agent task allocation problems. For instance, the task allocation becomes more challenging in a scenario where each task has a deadline associated with it and execution time of the tasks cannot be pre-computed as they are dependent on previous tasks. The method of present disclosure provides a scalable solution for dynamic scheduling and rescheduling that handles tasks with multiple pickup and drop locations and dynamic execution time using the agents with heterogeneous speed in a more efficient manner, reducing indirect operating costs and increasing revenue potential while minimizing additional penalty due to run time delays that an agent may encounter.

15 Claims, 6 Drawing Sheets

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01)

(56) References Cited

U.S. PATENT DOCUMENTS

| | | | |
|---|---|---|---|
| 2018/0081720 A1* | 3/2018 | Zlatanchev | G06F 9/4887 |
| 2020/0004588 A1* | 1/2020 | Sarkar | B25J 9/1661 |

OTHER PUBLICATIONS

Alameddine et al, "Dynamic Task Offloading and Scheduling for Low-Latency IoT Services in Multi-Access Edge Computing", IEEE Journal on Selected Areas in Communications, vol. 37, No. 3, Mar. 2019, pp. 668-682 (Year: 2019).*

Anjum, M.D. Nashid et al., "Dynamicscheduling and analysis of real time systems with multiprocessors", Digital Communications and Networks, Date: Aug. 2016, vol. 2, Issue: 3, pp. 130-138, Publisher: Elsevier, https://www.sciencedirect.com/sdfe/reader/pii/S235286481630030X/pdf.

Kim, Jae-Gon et al., "Minimizing Tardiness Penalty Costs in Job Shop Scheduling under Maximum Allowable Tardiness", Processes, Date: Aug. 2020, vol. 8(11), Publisher: MDPI, https://www.mdpi.con 2227-9717/8/11/1398.

* cited by examiner

SYSTEMS AND METHODS FOR DYNAMIC TASK SCHEDULING AND RESCHEDULING USING HETEROGENEOUS MULTI-AGENT FLEET

PRIORITY CLAIM

This U.S. patent application claims priority under 35 U.S.C. § 119 to: India Application No. 202121033790, filed on Jul. 27, 2021. The entire contents of the aforementioned application are incorporated herein by reference.

TECHNICAL FIELD

The disclosure herein generally relates to task scheduling and rescheduling, and, more particularly, to systems and methods for dynamic task scheduling and rescheduling using heterogeneous multi-agent fleet.

BACKGROUND

With advent of industry 4.0, usage of multi-agent systems has gained momentum in many industries ranging from warehouse and sorting centers to factory floors and production lines. The multi-agent systems may comprise a fleet of autonomous robots who are employed to cooperatively perform a given set of tasks such that the set of tasks can be completed efficiently and with minimal cost while producing a quality solution. This requires a suitable task allocation mechanism that decides which agent should do which subset of tasks and in which order such that a given objective is achieved. Thus, a multi-robot task allocation (MRTA) algorithm plays an anchor role to drive the multi-agent systems in an efficient way. Though there exists a number of methods that provide a solution for the multi-robot task allocation (MRTA), they do not perform well in varying scenarios.

SUMMARY

Embodiments of the present disclosure present technological improvements as solutions to one or more of the above-mentioned technical problems recognized by the inventors in conventional systems. For example, in one embodiment, a method for dynamic task scheduling and rescheduling using heterogeneous multi-agent fleet is provided. The method comprising receiving, via one or more hardware processors, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters; obtaining, via the one or more hardware processors, a first task list by sorting the set of tasks based on the corresponding predefined deadline and the corresponding predefined penalty for missing the corresponding predefined deadline; selecting, via the one or more hardware processors, a first task from the first task list such that the corresponding predefined penalty of the first task is maximum in comparison to the corresponding predefined penalties of one or more remaining tasks in the first task list to perform one of: (i) iterating the first task on the plurality of heterogeneous agents to identify a first set of agents such that the first task is schedulable on the first set of agents without missing the corresponding predefined deadline when executed from a current location to a second location through a first location, and (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent, or (a) adding the first task to a second task list when the first task is non-schedulable on the plurality of heterogeneous agents without missing the corresponding predefined deadline, wherein the second task list is a subset of the first task list; iteratively performing previous step for each task in the first task list to obtain a first task allocation sequence; scheduling, via the one or more hardware processors, each task from the second task list to the plurality of heterogeneous agents such that a minimum penalty out of the corresponding predefined penalties is incurred and a second task allocation sequence is obtained; detecting, via the one or more hardware processors, a delay in execution of a plurality of tasks to determine a status indicative of missing the corresponding predefined deadline or not missing the corresponding predefined deadline by corresponding agents during execution of the plurality of tasks; and dynamically creating, via the one or more hardware processors, based on the status indicative of missing the corresponding predefined deadline, a new schedule by performing one of: (a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and swapping each of the plurality of tasks being executed by the corresponding agents missing the corresponding predefined deadline with a second task scheduled on the corresponding agents; or (i) determining whether each of the plurality of tasks being executed by the corresponding agents missing the corresponding predefined deadline is reschedulable on an agent from the plurality of heterogeneous agents that is different from the corresponding agent while incurring lesser penalty in comparison to the corresponding predefined penalty, and allocating each of the plurality of tasks to the agent from the plurality of heterogeneous agents that is different from the corresponding agent.

In another aspect, a system for dynamic task scheduling and rescheduling using heterogeneous multi-agent fleet is provided. The system comprising a memory storing instructions; one or more communication interfaces; and one or more hardware processors coupled to the memory via the one or more communication interfaces, wherein the one or more hardware processors are configured by the instructions to receive, via one or more hardware processors, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters; obtain, via the one or more hardware processors, a first task list by sorting the set of tasks based on the corresponding predefined deadline and the corresponding predefined penalty for missing the corresponding predefined deadline; select, via the one or more hardware processors, a first task from the first task list such that the corresponding predefined penalty of the first task is maximum in comparison to the corresponding predefined penalties of one or more remaining tasks in the first task list to perform one of: (i) iterating the first task on the plurality of heterogeneous agents to identify a first set of agents such that the first task is schedulable on the first set of agents without missing the corresponding predefined deadline when executed from a current location to a second location through a first location, and (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent, or (a) adding the first task to a second task list when the first task is non-schedulable on the plurality of heterogeneous agents without missing the corresponding predefined deadline, wherein the second task list is a subset of the first task list; iteratively perform previous step for each task in the first task list to obtain a first task allocation sequence; schedule, via the one or more hardware processors, each task from the second task list to the plurality of heterogeneous agents such that a minimum penalty out of the corresponding predefined penalties is incurred and a second task allocation sequence is obtained; detect, via the one or more hardware processors, a delay in execution of a plurality of tasks to determine a status indicative of missing the corresponding predefined deadline or not missing the corresponding predefined deadline by corresponding agents during execution of the plurality of tasks; and dynamically create, via the one or more hardware processors, based on the status indicative of missing the corresponding predefined deadline, a new schedule by performing one of: (a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and swapping each of the plurality of tasks being executed by the corresponding agents missing the corresponding predefined deadline with a second task scheduled on the corresponding agents; or (i) determining whether each of the plurality of tasks being executed by the corresponding agents missing the corresponding predefined deadline is reschedulable on an agent from the plurality of heterogeneous agents that is different from the corresponding agent while incurring lesser penalty in comparison to the corresponding predefined penalty, and allocating each of the plurality of tasks to the agent from the plurality of heterogeneous agents that is different from the corresponding agent.

In yet another aspect, a non-transitory computer readable medium for dynamic task scheduling and rescheduling using heterogeneous multi-agent fleet is provided. The non-transitory computer readable medium comprising one or more instructions which when executed by one or more hardware processors cause receiving, via one or more hardware processors, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters; obtaining, via the one or more hardware processors, a first task list by sorting the set of tasks based on the corresponding predefined deadline and the corresponding predefined penalty for missing the corresponding predefined deadline; selecting, via the one or more hardware processors, a first task from the first task list such that the corresponding predefined penalty of the first task is maximum in comparison to the corresponding predefined penalties of one or more remaining tasks in the first task list to perform one of: (i) iterating the first task on the plurality of heterogeneous agents to identify a first set of agents such that the first task is schedulable on the first set of agents without missing the corresponding predefined deadline when executed from a current location to a second location through a first location, and (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent, or (a) adding the first task to a second task list when the first task is non-schedulable on the plurality of heterogeneous agents without missing the corresponding predefined deadline, wherein the second task list is a subset of the first task list; iteratively performing previous step for each task in the first task list to obtain a first task allocation sequence; scheduling, via the one or more hardware processors, each task from the second task list to the plurality of heterogeneous agents such that a minimum penalty out of the corresponding predefined penalties is incurred and a second task allocation sequence is obtained; detecting, via the one or more hardware processors, a delay in execution of a plurality of tasks to determine a status indicative of missing the corresponding predefined deadline or not missing the corresponding predefined deadline by corresponding agents during execution of the plurality of tasks; and dynamically creating, via the one or more hardware processors, based on the status indicative of missing the corresponding predefined deadline, a new schedule by performing one of: (a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and swapping each of the plurality of tasks being executed by the corresponding agents missing the corresponding predefined deadline with a second task scheduled on the corresponding agents; or (i) determining whether each of the plurality of tasks being executed by the corresponding agents missing the corresponding predefined deadline is reschedulable on an agent from the plurality of heterogeneous agents that is different from the corresponding agent while incurring lesser penalty in comparison to the corresponding predefined penalty, and allocating each of the plurality of tasks to the agent from the plurality of heterogeneous agents that is different from the corresponding agent.

In accordance with an embodiment of the present disclosure, the one or more task specific parameters comprising coordinates of the first location and the second location.

In accordance with an embodiment of the present disclosure, the first location is indicative of a pickup location and the second location is indicative of a drop location.

In accordance with an embodiment of the present disclosure, the one or more static agent specific parameters comprising agent speed without any payload, an agent speed with payload, an actuation time to a perform a first subtask, and an actuation time to perform a second subtask.

In accordance with an embodiment of the present disclosure, the one or more dynamic agent specific parameters comprising a current location and a residual energy of the agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
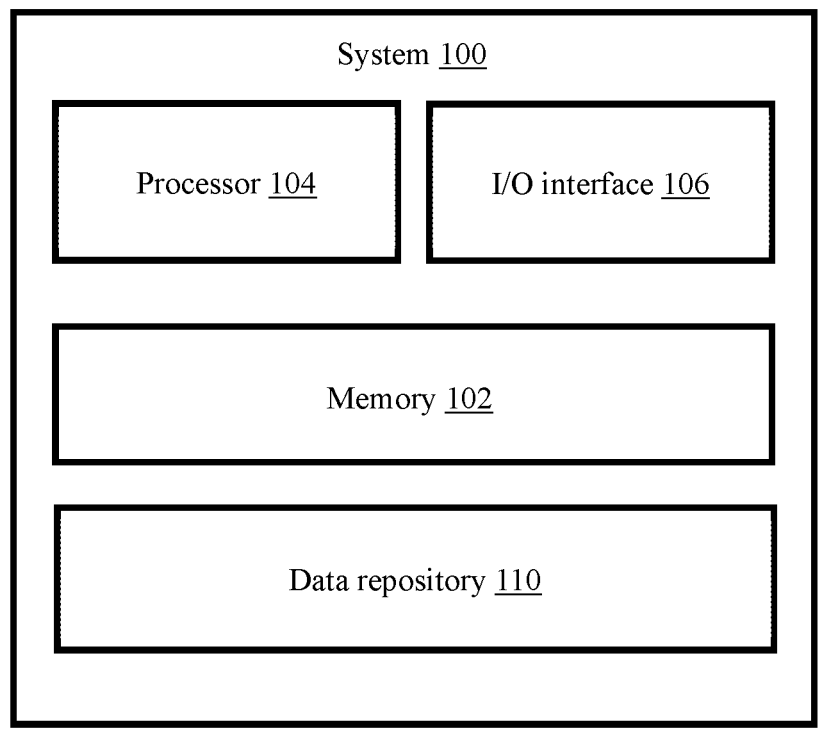
FIG. 1 illustrates an exemplary block diagram of a system for dynamic task scheduling and rescheduling using heterogeneous multi-agent fleet according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In general, industrial automation applications such as production plants employ multi-agent systems. In a production plant, there are a number of production lines that require various raw materials that are stored in an adjacent warehouse. Each production line requires one or more raw materials that are different from each other and of different quantity. The rate of consumption of different raw materials at different production lines also varies. In the production plants, agents perform task of transporting the raw materials from their storage location to various gates of the production lines. In other words, there are a number of forklift trucks or automated vehicles that ferries the raw material from a storage location in the warehouse to the production line. Since there is only limited space available near the production lines, the required raw materials cannot be stored in a large quantity. As a result, the raw materials need to be replenished regularly so that respective production does not get halted. Thus, it has to be assumed that a latest time by when a particular material should be delivered to a particular production site can be estimated. This sets a deadline for each replenishment task. Since number of operative production lines can vary over time, overall demand, a.k.a., the set of tasks can vary across days or even different shifts within 24 hour. Moreover, for human driven forklift trucks, number of drivers can also vary at times resulting in variation in number of active vehicles in the fleet. As a result, a fixed schedule for the tasks is not sufficient. Further, the vehicles require refueling or recharging. Thus, completion of a set of tasks should be done with minimum overall travel distance by all the vehicles. Now refueling or recharging the vehicles requires some amount of time. Even though refueling or replacing a battery of the vehicles require less amount of time compared to recharging the battery, the time is not insignificant. Also, there can be only a limited number of refueling or recharging stations. As a result, all the vehicles should not queue up at same time. Thus, the task allocation should also ensure that the number of simultaneous vehicles that requires refueling or recharging, does not exceed much more than the number of available stations. In other words, there should be enough vehicles available to complete a future set of tasks within their deadline.

Unlike conventional task scheduling problems, where a task is discarded if it fails to meet the deadline, tasks in the production plant must be completed even if it adds an extra operational expenditure. This precipitates one to formulate a task scheduler that can tackle dynamics of physical reality. Since the multi-agent fleet comprises of heterogeneous agents, where each task has a deadline associated with it and execution time of the tasks cannot be pre-computed as they are dependent on previous tasks. As a result, the execution time of the task has to be calculated during the allocation process based on ordering of the tasks. Also, the tasks incur some penalty to the multi-agent system if they cannot be completed within their deadline, thus complexity of task allocation increases while deciding which task to be allocated to which agent. Further, with dynamically changing environment, it may be challenging to estimate exact time of movement from point A to point B. Since the multi-agent systems are only approximations of the physical reality, there is a discrepancy between execution and planning. For instance, some of the agents may have to slow down or reroute to avoid collision, vehicle drivers may take a longer break during and/or in-between replenishment tasks, and the like. In such cases, the tasks may be delayed by a certain amount of time and may not be completed within their predefined deadline. Delay in completion of one task has a cascading effect on the completion time of the other tasks in the agent's queue. Appropriate completion time is critical in cases where the delay in delivery of a raw material to the production line may partially halt the production for some time due to unavailability of the raw material. Though the affect is not catastrophic, it incurs some penalty to the production line. With more delay (beyond an estimated deadline) in delivering the raw materials, more is the accumulated penalty.

The goal of task allocation is to allocate the tasks among the heterogeneous agents so that overall penalty to complete all the tasks is minimal. Moreover, during the execution of the tasks, the agents can encounter delays for various reasons. This can impact the future tasks of the agent and drastically increase the penalty of the system. In the context of the present disclosure, the expressions 'agent', 'vehicle' and 'robot' may be used interchangeably. Although further description of the present disclosure is directed to a production plant, it may be noted that the described application is non-limiting and systems and methods of the present disclosure may be applied in any domain, where the task allocation is very dynamic and the execution time cannot be pre-computed such as courier service, carpool service, product delivery service, and the like.

The present disclosure is directed to dynamic task scheduling and rescheduling that not only considers dynamic execution time of the tasks and heterogeneity of the agents, but also minimizes additional penalties occurred due to runtime delays that any agent may encounter. Conventional exact and heuristic methods for task scheduling and rescheduling do not scale well with dynamic scenario and operate under an unrealistic condition that there will be no change to an initial schedule, neither do they take into consideration separate pickup locations and drop locations of different tasks, analogous to random site locations of depots. For example, in specific scenarios, there exists a setup with a warehouse on one side which has various goods stacked across at different locations. These goods need to be picked from their various pickup locations and dropped at different production lines, which are referred as drop locations. Thus, the task allocation is a more complex decision making, which factors distance between different tasks, their distance from their respective depots. Most of the conventional methods focus at minimizing deadline miss, however, in the warehouse scenario, missing deadlines cannot be equated with lowest penalty. Therefore, to minimize penalty incurred, rescheduling techniques can be useful in minimizing this penalty that is incurred for those tasks which cannot meet their deadline at all. There exists a conventional method that describes an ILP formulation for tasks with unit execution time, deadline constraint and penalty constraint. However, the conventional method does not consider tasks with dynamic non-unit execution time nor does it factor in heterogeneous agents. Thus, the prevalent methods become impractical.

The present disclosure provides a heuristic method where the goal is to minimize the overall penalty of the multi-agent system. The mathematical formulation of the technical problem may be presented as given hereinafter. Suppose a multi-agent system T is created with a set of n tasks, wherein T is represented as $T = t_1, t_2, t_3 \ldots t_n$ which is known before starting the task scheduling. Here, a task is formally represented as $(e_{ij}, d_j, p_j)$, where $e_{ij}$ is the execution time of task j on agent i, $d_j$ is the deadline and $p_j$ is the penalty. These tasks are to be scheduled on m heterogeneous agents. Further, a term slack is defined to quantify by how much the task has missed it's deadline and formulated as $(k+e_{ij}-d_j)$. In the method of present disclosure, a soft deadline is assumed which means if a task is not discarded if it fails to meet its deadline, instead a penalty is incurred that is directly proportional to the slack. Here, penalty function $P_{ij}$ is defined as $P_{ij} = \max\{0, (c_{ij}-d_j), p_j\}$, where $c_{ij}$ represents completion time for task $t_{ij}$. The method of present disclosure discloses a task scheduling approach that makes a decision task allocation to the heterogeneous agents based on a dynamic execution time which is computed by taking Manhattan distance between pickup and drop coordinates of the task. Let $x_{i,j}^k$ be a decision variable that takes a value 1 if task $t_j$ is assigned to an agent $a_i$ at time instant k; otherwise, it is set to 0. To compute the penalty, a formulation $\max\{0, (k+e_{ij}d_j)*p_j\}$ is used where, $k+e_{ij}$ is the completion time of the task $t_j$. Thus, objective function of the method of present disclosure is provided in equations 1 below as:

$$\min \sum_{i=1}^{m} \sum_{j=1}^{n} \sum_{t=1}^{k} (t + e_{ij} - d_j) * p_j * x_{ij}^t \quad (1)$$

s.t.

$$\sum_{i=1}^{m} \sum_{t=a_j}^{k} x_{ij}^t = 1, \forall j \in \{0, n\} \quad (2)$$

$$\sum_{i=1}^{m} \sum_{t=1}^{a_j-1} x_{ij}^t = 0 \; \forall j \in \{0, n\} \quad (3)$$

$$\sum_{i=1}^{n} x_{ij}^t \leq 1, \forall t \in \{0, k-1\} \quad (4)$$

$$x_{ij}^t + \left(\frac{1}{e_{ij}-1}\right) \sum_{l=1}^{n} \sum_{t=k+1}^{k+e_{ij}-1} x_{lj}^t \leq 1, \forall t \in \{0, K-1\} \quad (5)$$

Here, Eq. 2 ensures that every task is assigned only once and to only one robot and Eq. 3 ensures that multiple tasks are not assigned to a robot at the same time instance. Here, K is set to a large enough value that is sufficient to complete all the task.

Referring now to the drawings, and more particularly to FIG. 1 through 4C, where similar reference characters denote corresponding features consistently throughout the figures, there are shown preferred embodiments and these embodiments are described in the context of the following exemplary system and/or method.

FIG. 1 illustrates an exemplary block diagram of a system 100 for dynamic task scheduling and rescheduling using heterogeneous multi-agent fleet according to some embodiments of the present disclosure. In an embodiment, the system 100 includes processor(s) 104, one or more communication interface(s), alternatively referred as or input/output (I/O) interface(s) 106, and one or more data storage devices or memory 102 operatively coupled to the processor(s) 104. The processor(s) alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, component modelers, and/or any devices that manipulate signals/inputs based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports can be configured to receive inputs stored external to the system 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a data repository 110 for storing data processed, received, and generated as output(s) by the system 100.

The data repository 110, amongst other things, includes a system database. In an embodiment, the data repository 110 may be external (not shown) to the system 100 and accessed through the I/O interfaces 106. The memory 102 may further comprise information pertaining to input(s)/output(s) of each step performed by the processor 104 of the system 100 and methods of the present disclosure. In an embodiment, the system database stores information pertaining to inputs fed to the system 100 and/or outputs generated by the system (e.g., at each stage), specific to the methodology described herein. More specifically, the system database stores information being processed at each step of the proposed methodology.

Figure 2A:
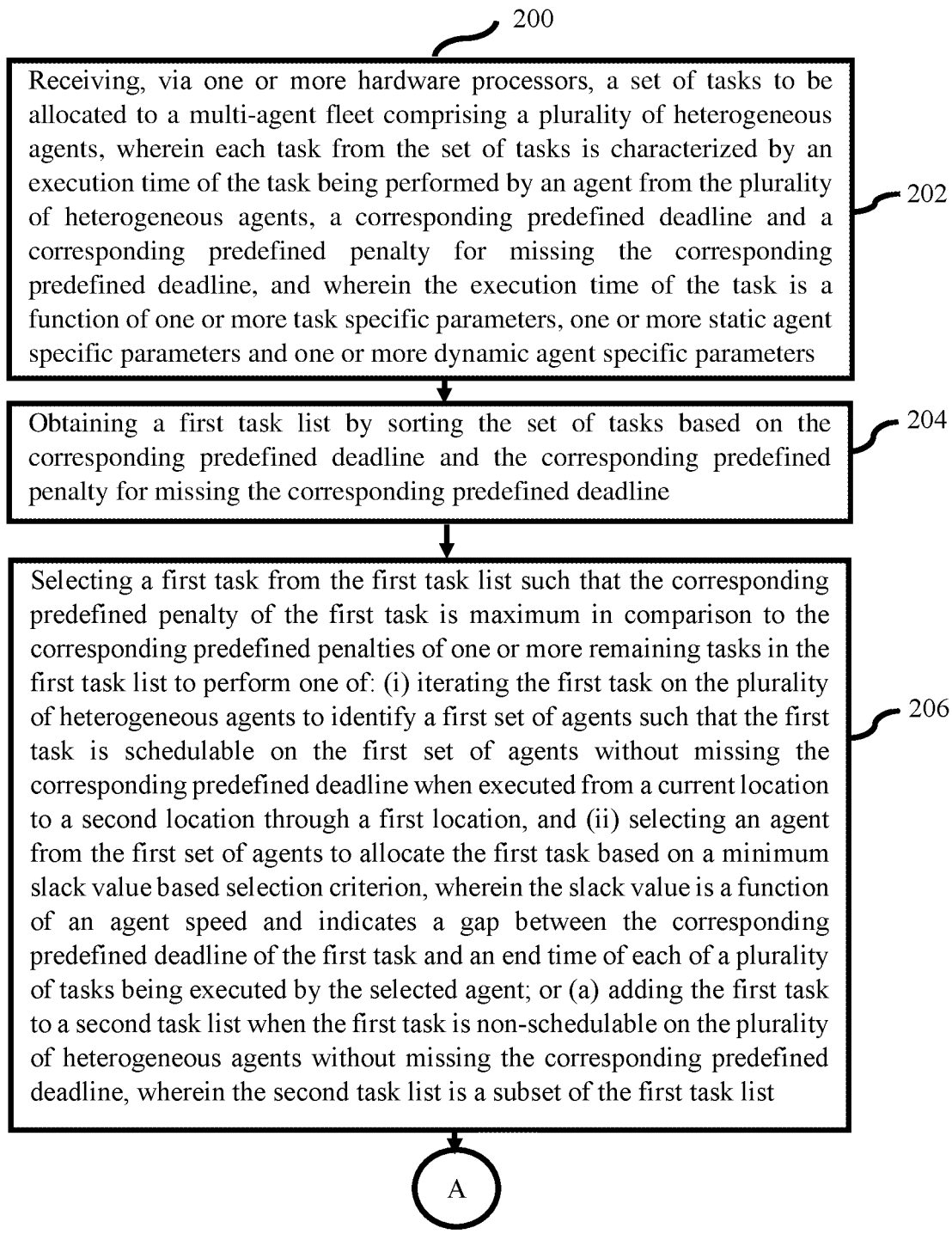
FIGS. 2A and 2B illustrate an exemplary flow diagram of a method for dynamic task scheduling and rescheduling using heterogeneous multi-agent fleet according to some embodiments of the present disclosure.
Figure 2B:
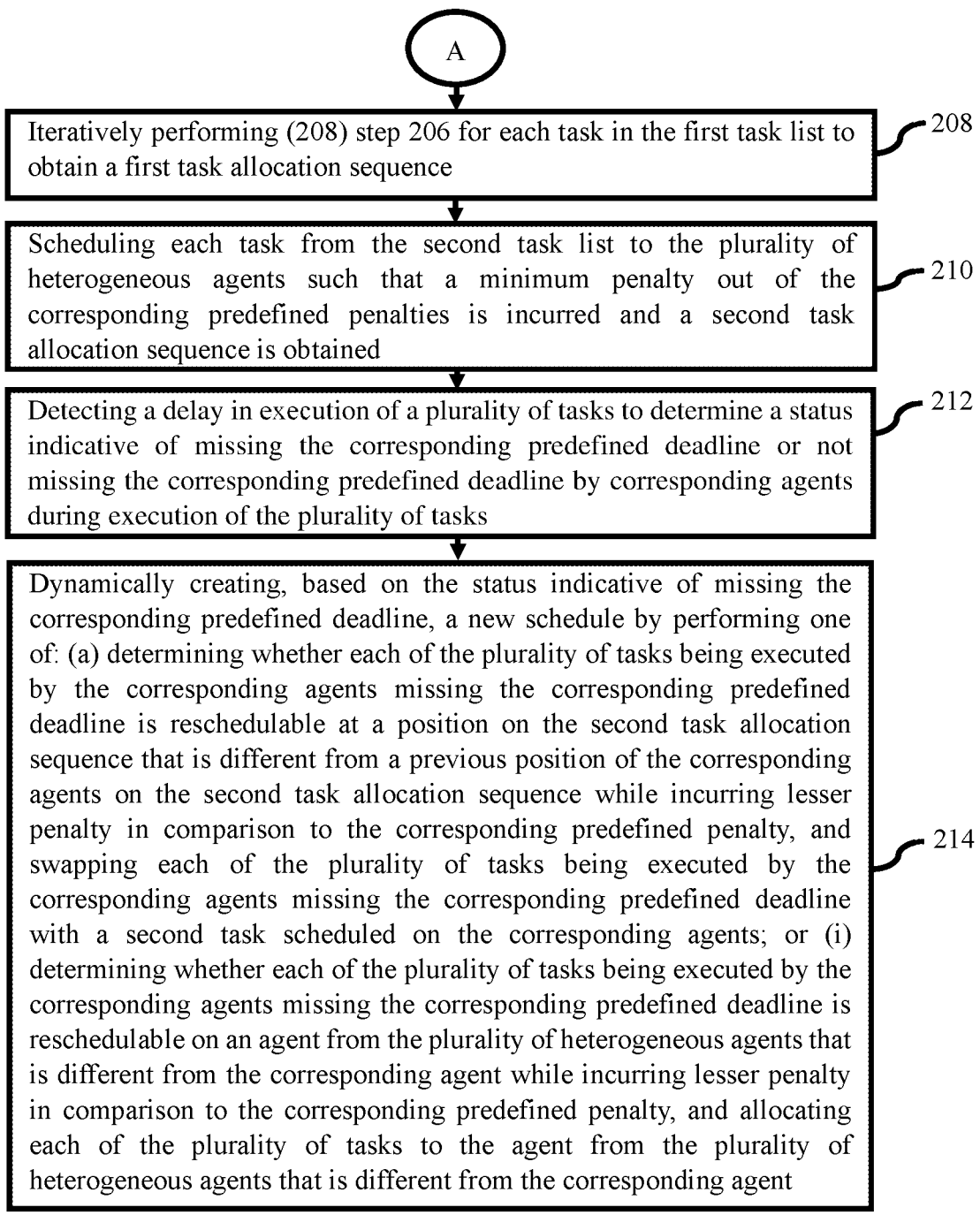

In an embodiment, the one or more hardware processors 104 can be configured to perform a method for dynamic task scheduling and rescheduling using heterogeneous multi-agent fleet, which can be carried out by using methodology, described in conjunction with FIGS. 2A and 2B, and use case examples.

FIGS. 2A and 2B illustrate an exemplary flow diagram of a method for dynamic task scheduling and rescheduling using heterogeneous multi-agent fleet using the system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIGS. 2A and 2B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200 depicted in FIG. 2A, in an embodiment of the present disclosure, at step 202, the one or more hardware processors 104 are configured to receive a set of tasks to be allocated to a multi-agent fleet comprising a plurality of heterogeneous agents. In an embodiment, each task from the set of tasks is characterized by an execution time of the task being performed by an agent from the plurality of heterogeneous agents, a corresponding predefined deadline and a corresponding predefined penalty for missing the corresponding predefined deadline. For instance, a production plant scenario is considered, wherein a task is defined as transporting goods from a pickup location (a storage location) to a drop location and an agent is the one who performs the task. In an embodiment, each task in the set of tasks is independent which means there are no precedent constraints between the tasks. To increase throughput and efficiency, multiple agents are required to execute tasks in parallel. In an embodiment, the agent could be but not limited to a robot, an automated vehicle, and/or the like. Further, the plurality of heterogeneous agents (hereafter referred as agents throughout the description) are used which implies that each agent may perform task with a different speed, thereby a constant speed for all of the agents to perform the task is not considered as in case of homogeneous agents utilized in conventional methods of task allocation. In an embodiment, each task from the set of tasks is associated with a corresponding predefined deadline represented by $d_i$ which is a soft deadline with in which the task must be executed, otherwise a penalty is incurred if the corresponding predefined deadline for task execution is missed. In an embodiment, if the task completes execution at time instant $c_i$, then the corresponding predefined penalty incurred is represented by $(c_i-d_i)*p_i$ units. Here, $p_i$ represents the penalty per unit time. Further, the execution time of the task is a function of one or more task specific parameters, one or more static agent specific parameters and one or more dynamic agent specific parameters. In an embodiment, one or more task specific parameters comprising coordinates of a first location and a second location. Here, the first location is indicative of a pickup location and the second location is indicative of a drop location. In an embodiment, the one or more static agent specific parameters comprising an agent speed without any payload, an agent speed with payload, an actuation time to a perform a first subtask, and an actuation time to perform a second subtask. For instance, when a task refers to transporting an object from a pickup location to a drop location, then the first subtask refers to picking up the object from pickup location and the second subtask refers to dropping the object the drop location. In an embodiment, the agent speed without payload means when the agent is not carrying anything and thus able to move at 10 Km/h maximum speed, whereas the agent speed with payload means when the agent is carrying a payload of 50 kg, then capability of agent to move is maximum speed is 8 km/h. Further, the one or more dynamic agent specific parameters comprising a current location and a residual energy of the agent. For example, in a production environment, different goods may have to be retrieved from different warehouse locations and placed at different production belts, thus different tasks have different pickup locations and drop locations. Additionally, the agent servicing a particular task may not be present at the pickup location of the task, rather it can be present at a different location such as a charging dock, a parking spot, or at drop location of a previously executing task and thus needed to move to the pickup location of the next task. This introduces an element of dynamic computation of execution time. In an embodiment, the residual energy of the agent could be indicative of battery level of the agent which may get exhausted while executing a task, thereby impacting task execution time.

Further, at step 204 of FIG. 2A, the one or more hardware processors 104 are configured to obtain a first task list by sorting the set of tasks based on the corresponding predefined deadline and the corresponding predefined penalty for missing the corresponding predefined deadline. In an embodiment, the first task list is alternatively referred as a sorted task list in which a task with highest penalty comes in front. Upon obtaining the first task list, as depicted in step 206 of FIG. 2A, the one or more hardware processors 104 are configured to select a first task from the first task list such that the corresponding predefined penalty of the first task is maximum in comparison to the corresponding predefined penalties of one or more remaining tasks in the first task list to perform one of: iterating the first task on the plurality of heterogeneous agents to identify a first set of agents such that the first task is schedulable on the first set of agents without missing the corresponding predefined deadline when executed from the current location to the second location through the first location. Here, the first set of agents refers to those agents on which the first task can be scheduled. For example, if the first task is to take an object from Delhi to Mumbai, then Delhi becomes the first location and Mumbai becomes the second location and travel time indicative of the corresponding predefined deadline of the first task is known beforehand. However, the current location of traveler might be Kolkata/Chennai/Bangalore, in which case the execution time of taking the object from Delhi to Mumbai needs to include travel time from current location (e.g., Kolkata/Chennai/Bangalore) to Delhi as well. This lends a dynamic nature to the calculation of execution time as the current location is not known beforehand.

Further, an agent from the first set of agents is selected to allocate the first task based on a minimum slack value based selection criterion. In an embodiment, the slack value is a function of an agent speed and indicates a gap between the corresponding predefined deadline of the first task and an end time of each of a plurality of tasks being executed by the selected agent. In another embodiment, the slack value is the normalized slack value which is computed as a difference between the corresponding predefined deadline of the first task and the end time of all tasks on that agent, multiplied by the agent speed. Once the selected agent is determined, the first task is scheduled on the selected agent. However, the first task is added to a second task list when the first task is non-schedulable on the plurality of heterogeneous agents without missing the corresponding predefined deadline. The second task list can be alternatively referred as unscheduled task list. In an embodiment, the second task list is a subset of the first task list. Further, at step 208 of FIG. 2B, the one or more hardware processors 104 are configured to iteratively perform step 206 for each task in the first task list to obtain a first task allocation sequence. In an embodiment, the first task allocation sequence provides a mapping of a plurality of tasks to agents. For example, it is assumed that an agent A is mapped to task 1, task 4, task 5 and task 6, agent B mapped to task 2 and agent C mapped to task 3. Thus, the task allocation sequence is represented by {A→1, 4,5,6}, {B→2} and {C→3}. Furthermore, at step 210 of FIG. 2B, the one or more hardware processors 104 are configured to schedule each task from the second task list to the plurality of heterogeneous agents such that a minimum penalty out of the corresponding predefined penalties is incurred, and a second task allocation sequence is obtained. In an embodiment, the second task allocation sequence is a final task allocation sequence and the first task allocation sequence is a subset of the second task allocation sequence. The dynamic task scheduling process is completed after performing a final load balancing step.

The dynamic task scheduling method with minimum penalty as proposed in the method of present disclosure is further explained with the help of a non-limiting example. Suppose, the set of received task are assigned IDs in an order '1', '2', and '3', then the first task list may have tasks ID in order '2', '1', '3' based on order of penalty such that task assigned with ID '2' has highest and task assigned with ID '3' has lowest priority. Further, it is assumed that the multi-agent fleet comprises three agents namely agent A, agent B, and agent C who are capable of performing task with varying speed. In this case, task assigned with ID '2' is selected as the first task. It is further checked whether the task assigned with ID '2' is schedulable on any of the agents A, B and C. Again, it is assumed that task assigned with ID '2' is schedulable on agents A and C. Here, agents A and C refer to the first set of agents. Further, the minimum slack value based selection criteria is used to select one of the two agents. Furthermore, it is assumed that agent A has a lower slack value so task assigned with ID '2' is mapped to agent A. Similarly, a next task which is the task assigned with ID '1' is selected based on order of penalty/priority, and it is checked if the task assigned with ID '1' is schedulable across any of the agents within it's corresponding predefined deadline. In case, that it is not possible. then the task assigned with ID '1' is assigned to the second task list. The process is then repeated for the task assigned with ID '3' and it is assumed that task assigned with ID '3' is mapped to agent C. Now that all tasks in the first task list have either been assigned or put into the second task list, all tasks in the second task list are scheduled such that overall penalty is minimized.

The dynamic task scheduling method with minimum penalty as proposed in the method of present disclosure may be represented as given below.

```
Input: Set of tasks with corresponding predefined deadline,
corresponding predefined penalty,
pickup and drop coordinates
Initialization: unscheduled_list = Ø;
1      TaskQueue ← Sorted task list based on penalty and deadline;
          while TaskQueue = Ø; do
2            currTask ← first element of TaskQueue
3            Iterate across all agents
4            if currTask is schedulable on that agent then
5               select agent with minimum selection criteria
6            end
7            if currTask is not schedulable on any agent then
8               unscheduled_list ← currTask
9            end
10           ;
11     end
12     ; Pop currTask from TaskQueue;
          Schedule all unscheduled tasks that are missing their deadline;
          Perform Load Balancing;
```

In an embodiment, during the execution of the tasks, the agents can encounter delays due to dynamically changing environment. This can impact the future set of tasks of the plurality of heterogeneous agents and drastically increase the penalty of the system 100 of the present disclosure. For instance, some of the agents may have to slow down or reroute to avoid collision, vehicle drivers may take a longer break during and/or in-between replenishment tasks, and/or the like. In such cases, execution of the set of tasks may be delayed by a certain amount of time and may not be completed within their corresponding predefined deadlines. Further, delay in completion of one task has a cascading effect on the completion time of other tasks in the agent's queue. Appropriate completion time is critical in cases where delay in delivery of a raw material to the production line may partially halt the production for some time due to unavailability of a raw material. Though the affect is not catastrophic, it incurs some penalty to the production. With more delay (beyond an estimated deadline) in delivering the raw materials, more is accumulated penalty. Thus, a dynamic task rescheduling method is described in the method of present disclosure such that a new schedule is created after rescheduling when a delay is encountered that leads to missing the corresponding predefined deadlines by the plurality of heterogeneous agents.

Referring back to FIG. 2B, at step 212, the one or more hardware processors 104 are configured to detect a delay in execution of a plurality of tasks to determine a status indicative of missing the corresponding predefined deadline or not missing the corresponding predefined deadline by corresponding agents during execution of the plurality of tasks. In other words, as soon as a delay on an agent is detected, it is determined whether the delay is large enough for any task on that agent to miss their deadlines. If there are no additional deadline misses, the dynamic task scheduling process proceeds without any changes. However, as depicted in step 214 of FIG. 2B, based on the status indicative of missing the corresponding predefined deadline or where there is an additional deadline misses, the one or more hardware processors 104 are configured to dynamically create a new schedule by first determining whether each of the plurality of tasks being executed by the corresponding agents indicative of missing the corresponding predefined deadline is reschedulable at a position on the second task allocation sequence that is different from a previous position of the corresponding agents on the second task allocation sequence while incurring lesser penalty in comparison to the corresponding predefined penalty. If yes, then each of the plurality of tasks being executed by the corresponding agents indicative of missing the corresponding predefined deadline is swapped with a second task scheduled on the corresponding agents. Otherwise, it is determined whether each of the plurality of tasks being executed by the corresponding agents indicative of missing the corresponding predefined deadline is reschedulable on an agent from the plurality of heterogeneous agents that is different from the corresponding agent while incurring lesser penalty in comparison to the corresponding predefined penalty. In that case, each of the plurality of tasks are allocated to the agent from the plurality of heterogeneous agents that is different from the corresponding agent. Here, the corresponding predefined penalty is alternatively referred as base penalty and used hereafter throughout the description. In other words, if the delay is detected on an agent and a task is identified to be missing the corresponding predefined deadline, then a penalty called base_penalty for missing the deadline is calculated. Further, it is checked if the task can be switched with any other task on that agent itself such that penalty incurred is less than the base_penalty. If such a situation exists, the tasks are switched and a new schedule is created. Otherwise, it is checked if the task missing its deadline can be scheduled on any other agent in the system 100 such that the penalty incurred is lesser than the base_penalty. If so, the task is mapped to that new agent creating a new schedule.

The dynamic task rescheduling method as proposed in the method of present disclosure is further explained with the help of a non-limiting example. It is assumed that a task mapping of {A→1,4,5,6}, {B→2}, {C→3} exists which implies that agent A performs task 1, task 4, task 5 and task 6, agent B performs task 2, and agent C performs task 3 respectively. Further, if any delay is detected during execution of task 1, then it is first checked if other tasks (in this case task 4, task 5 and task 6) on the same agent (agent A in this case) exceed their corresponding predefined deadlines due to delay in the task 1 which they were not previously doing. If none of them are missing their corresponding predefined deadlines due to delay, then same schedule is proceeded after updating execution time of task 1 with its delay amount. Suppose, because of delay in the task 1, it is observed that the task 4 which was previously not missing the corresponding predefined deadline, is now exceeding it. Then, an overall penalty that incurred on agent A is computed in current schedule and referred as the base_penalty_A. Further, it is determined if the task 4 can be scheduled at any other position on agent A (say, between task 5 and task 6 or after task 6), such that the computed penalty is less than base_penalty_A. It is assumed that lesser penalty is incurred if the task 4 is scheduled after the task 6, then task 4 is repositioned after the task 6. If such a case is not possible, then it is determined if the task 4 can be scheduled on any other agent (say, agent B) such that overall system penalty (new_penalty_A+new_penalty_B) is less than (base_penalty_A +base_penalty_B). If so, the task 4 is allocated to the agent B thereby creating a new schedule. This check is done for agent C as well. A scenario where the system 100 incurs minimum penalty is chosen for formulating the new schedule.

The dynamic task rescheduling method as proposed in the method of present disclosure may be represented as given below.

```
    Input : agent_missing_deadline, curr_task being executed
       by
       agent_missing_deadline, agent_list, agent_task_queue
1   if additional task is missing deadline due to delay then
2      base_penalty← compute penalty including delay
3      flag = False
4      every next_Task in agent_task_queue;
       swap next_task curr_task;
       new_penalty = compute penalty after swapping; if
       new_penalty ¡ base_penalty then
5         new schedule created by swapping next_task and curr_task
6         flag gets True
7      end
8      if flag is False then
9         all agents in agent_list if curr_task is schedulable
          on agent then
10           new penalty gets compute penalty with curr_task on agent
             if new_penalty < base_penalty then
11              schedule curr_task on agent
12           end
13        end
14     end
15  end
```

Evaluation: The performance of the method of present disclosure is evaluated across a variety of datasets and against some well known methods. Datasets used: Datasets, which provide randomly generated pickup coordinates and drop coordinates of each task along with the corresponding predefined penalty and the corresponding predefined deadline, are created. Further, results for the datasets with 100 agents and 1000 tasks are presented, where each task is represented as a tuple $t_{ij}=(e_{ij},d_j,p_j)$. Here, the execution time $(e_{ij})$ is computed dynamically as the sum of the Manhattan distances between the drop location coordinates to the pickup location coordinations of the previous task and the pickup location coordinates to drop location coordinates of a current task. For each of these two datasets comprising 100 and 1000 tasks, four different datasets are generated that are comprising of pseudo-randomly generated deadlines discussed below.

$d_i=2e_i$: In this dataset, the deadline of a task is set to twice the execution time of the task. This is an extremely tight scenario where the deadlines are very close and many tasks are bound to miss their deadlines. This is used to represent a worst case scenario for the method of the present disclosure.

$d_i \in [e_i, 10e_i]$: In this dataset, the deadline is set to a random value in the range of $e_i$ and $10e_i$ (uniformly distributed).

$d_i \in [5e_i, 10e_i]$: Again, in this dataset, the deadline is set using a uniform distribution in the range of $5e_i$ and $10e_i$. This presents a case where there is enough space between tasks and thus many tasks can be scheduled within their deadlines.

$d_i \leftarrow$ mix: In order to ensure, the method of present disclosure does not favor a particular distribution of the deadline, a mix of all the previous three datasets with equal probability is used in this dataset.

Further, three datasets, each with a different range for penalty value, are generated which are discussed below.

$p \in [1, 10]$: In this dataset, the penalty is set to a random value generated using a uniform distribution in the range of 1 and 10.

$p \leftarrow$ mix: In this dataset, the penalty is set to same value (e.g., 1) for all the tasks.

$p \leftarrow$ extreme (1 or 10): In this dataset, the penalty is set to either of two extreme values, which are either 1 or 10 with equal probability.

Further, for implementing heterogeneous nature of agents, data sets which have a fleet of heterogeneous agents of two/three types are created. Here, each type is associated with a particular speed which is used to dynamically compute the execution time of a task between a pickup and drop location.

In an embodiment, the performance of the method of the present disclosure is evaluated based on three metrics (i) overall penalty incurred while completing all the tasks (P), (ii) number of deadline miss (DL-M), and (iii) makespan (MS) of completing all the tasks. The makespan is defined by $\max_{i \leq j \leq} c^T(a_j)$, where $c^T(a_j)$ represents completion time of all tasks allocated to agent $a_j$. In an embodiment, Table 1 provides a performance comparison of a conventional method with the method of present disclosure in terms of task-agent count for the three metrics.

TABLE 1

| Task-Agent Count | Conventional method | | | Method of the present disclosure | | |
|---|---|---|---|---|---|---|
| | Hit-Miss | Makespan | Penalty | Hit-Miss | Makespan | Penalty |
| 20-5 | 20-0 | 18 | 0 | 10-10 | 36 | 352 |
| 50-5 | 13-37 | 45 | 2930 | 13-37 | 80 | 4622 |

As can be seen in Table 1, as number of tasks increases, the penalty as obtained by the conventional method is approximately scaled by a factor of 2 of that obtained by the method of the present disclosure. However, time required by the conventional method is scaled exponentially. In an embodiment, the efficacy of the method of the present disclosure is evaluated based on a comparison with three well known methods.

TABLE 2

| Penalty | Deadline | Method 1 | | | Method 2 | | | Method 3 | | | Method of present disclosure | | |
|---|---|---|---|---|---|---|---|---|---|---|---|---|---|
| | | P | DL-M | MS | P | DL-M | MS | P | DL-M | MS | P | DL-M | MS |
| $p \in [1, 10]$ | $d_i = 2e_i$ | 1053174 | 744 | 1392 | 1084609 | 707 | 1513 | 1043095 | 648 | 1491 | 999516 | 624 | 1507 |
| | $d_i \in [2e_i, 5e_i]$ | 480590 | 484 | 1402 | 188682 | 222 | 1568 | 111132 | 131 | 1541 | 89445 | 127 | 1500 |
| | $d_i \in [2e_i, 10e_i]$ | 216618 | 231 | | | | | 590084 | 616 | 1488 | 588991 | 616 | 1486 |
| $p \in \{1, 10\}$ | $d_i = 2e_i$ | 743174 | 738 | 1383 | 663724 | 682 | 1458 | 64686 | 118 | 1536 | 45561 | 89 | 1495 |
| | $d_i \in [2e_i, 5e_i]$ | 294865 | 502 | 1397 | 111183 | 241 | 1555 | 8 | 2 | 3024 | 0 | 0 | 1493 |
| | $d_i \in [2e_i, 10e_i]$ | 150269 | 245 | 1398 | 10547 | 83 | 3038 | 276944 | 566 | 1444 | 278314 | 570 | 1455 |
| $p = 1$ | $d_i = 2e_i$ | 341099 | 740 | 1379 | 293814 | 649 | 1491 | 51249 | 112 | 1545 | 36489 | 83 | 1488 |
| | $d_i \in [2e_i, 5e_i]$ | 179683 | 493 | 1399 | 87532 | 241 | 1560 | 21 | 2 | 3011 | 0 | 0 | 1497 |
| | $d_i \in [2e_i, 10e_i]$ | 84658 | 251 | 1382 | 1731 | 94 | 3063 | | | | | | |

TABLE 3

| Agent Types | Method 1 | | | Method 2 | | | Method 3 | | | Method of present disclosure | | |
|---|---|---|---|---|---|---|---|---|---|---|---|---|
| | P | DL-M | MS | P | DL-M | MS | P | DL-M | MS | P | DL-M | MS |
| All same | 511835 | 499 | 1453 | 192565 | 203 | 1527 | 131951 | 149 | 1539 | 108906 | 152 | 1513 |
| 2 types | 480590 | 484 | 1402 | 188682 | 222 | 1568 | 111132 | 131 | 1541 | 89445 | 127 | 1500 |
| 3 types | 491140 | 486 | 1413 | 193754 | 221 | 1531 | 108095 | 138 | 1515 | 95637 | 135 | 1513 |
| All Different | 488501 | 487 | 1412 | 191346 | 209 | 1522 | 110943 | 138 | 1500 | 91502 | 134 | 1506 |

Table 2 provide a comparison of the three well known methods namely method 1, method 2 and method 3 with the method of present disclosure for each of the deadline types and penalty variations as described above. In another embodiment, Table 2 provides a performance comparison for nine datasets with 1000 tasks and 100 agents where there are two types of agents (50 agents of each type). This is referred as initial task allocation without consideration of runtime delays. As can be seen from Table 2 and Table 3, for $d_i=2e_i$, there is not much scope for improvement since the deadlines are closely spaced together. Here, the method of the present disclosure performs marginally better.

However, in cases where deadline is between $2e_i$ and $5e_i$ or $2e_i$ and $10e_i$, there is a room to move tasks around, thus large improvement could be seen in terms of the overall penalty incurred.

Table 3 provides a comparison of the three well known methods namely method 1, method 2 and method 3 with the method of present disclosure for different agent fleet compositions. For example, a comparison between homogeneous fleet of agent with agent fleets that are heterogeneous is performed as they may have two kinds of agents or three kinds of agents or a fleet where each agent is different. In another embodiment, Table 3 provides a performance comparison for a dataset with 1000 tasks (p $\in$[1, 10] and $d_i$ $\in$[$2e_i$,$5e_i$]) and 100 agents where there are varying number of agent types. However, runtime delays are not considered. It can be observed from Table 3 that in each case of agent types, the penalty is minimum for the method of the present disclosure.

Figure 3:
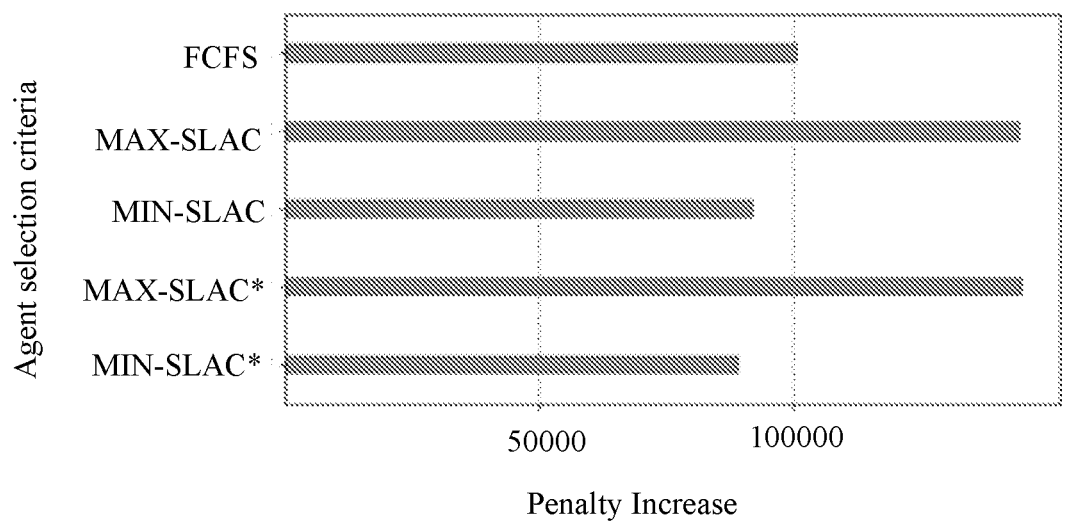
FIG. 3 illustrates a plot showing a performance evaluation of the method of present disclosure in terms of penalty variations for different agent selection criteria according to some embodiments of the present disclosure.

In an embodiment, before allocating a task to a particular agent, a slack value for that task and agent pair is computed and the task is assigned to the agent which has minimum slack value. To determine which slack value should be used for selecting an appropriate agent, the method of the present disclosure is evaluated for different forms of slack value namely First-Come-First-Serve (FCFS), MAX-SLAC, MIN-SLAC, MAX-SLAC* and MIN-SLAC* respectively. In FCFS, a first agent which can accommodate the task is selected. In MAX-SLAC, the agent which has largest slack value is selected. In MIN-SLAC, the agent with lowest slack value is selected. However, it is observed that in MAX-SLAC or MIN-SLAC, there is a bias towards faster agents which conversely increase makespan. So a normalized slack value is used based on the speed of the agents defined as MAX-SLAC* and MIN-SLAC*. FIG. 3 illustrates a plot showing performance evaluation of the method of present disclosure in terms of penalty variations for different agent selection criteria according to some embodiments of the present disclosure. In another embodiment, the plot shown in FIG. 3 illustrates impact of task sorting criteria on the overall penalty of the system 100. It is observed from FIG. 3 that the penalty increase across various datasets was least when MIN-SLAC* is used as the selection criteria.

Figure 4A:
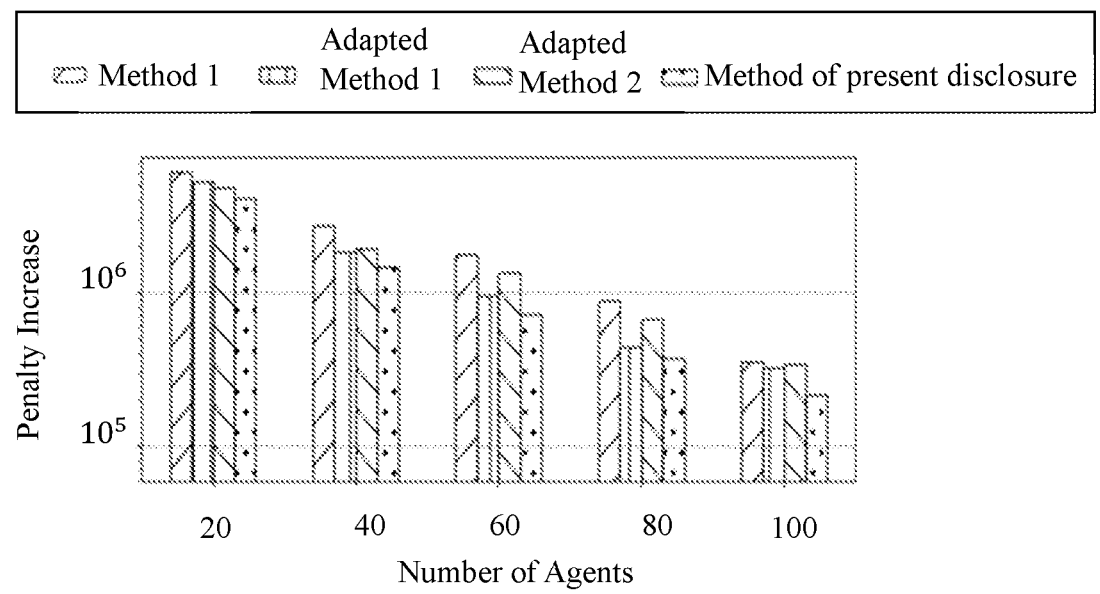
FIG. 4A through 4C illustrate plots showing a performance comparison in terms of delay distribution resulting in penalty increase among a well-known method, the method of present disclosure, and adaption of well-known methods with the method of present disclosure for a number of agents across a variety of datasets, in accordance with some embodiments of the present disclosure.
Figure 4B:
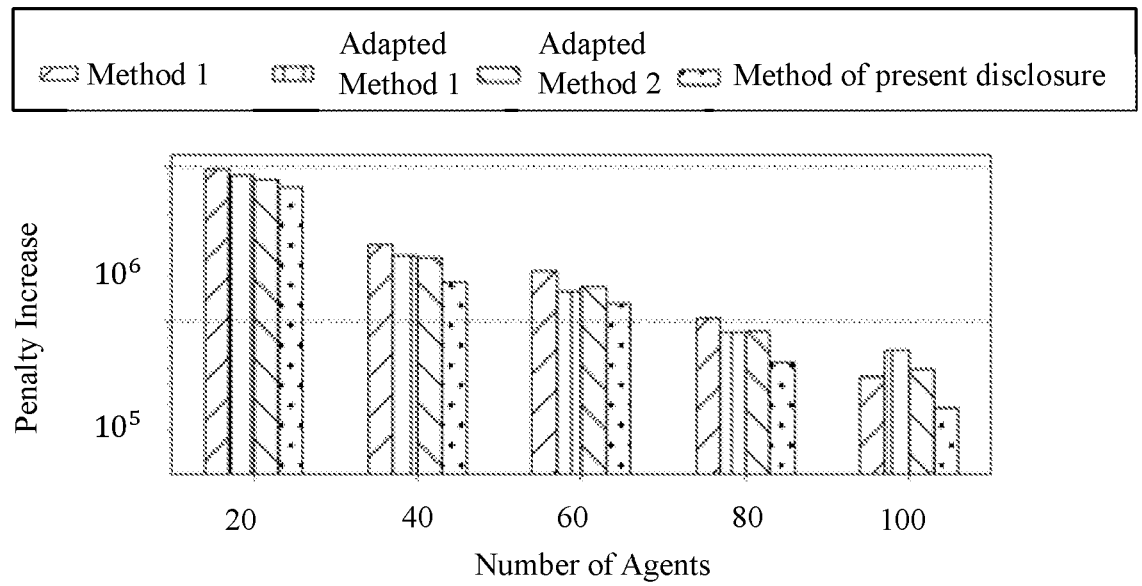
Figure 4C:
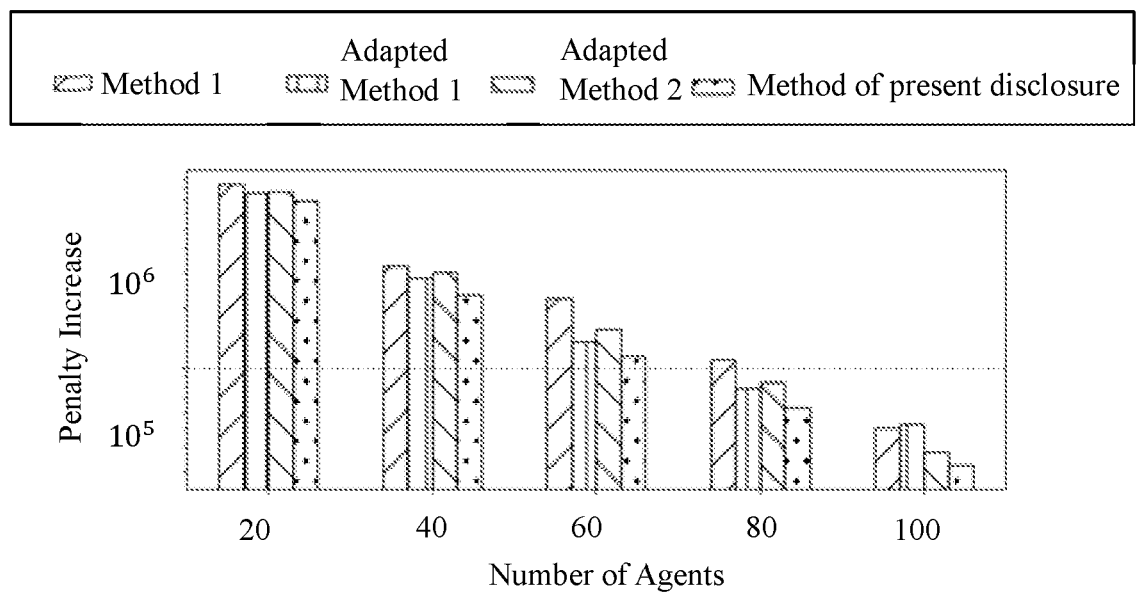

FIGS. 4A through 4C illustrate plots showing performance comparison in terms of delay distribution resulting in penalty increase among a well-known method (say method 1), the method of present disclosure, and adaption of well-known methods with the method of present disclosure (say adapted method 1, adapted method 2) for a number of agents across a variety of datasets, in accordance with some embodiments of the present disclosure. In an embodiment, initial data sets are kept same across the number of agents and the delay distributions are varied to study the penalty increase across different number of agents. To define metric of penalty increase, an initial penalty is computed which is incurred when there are no delays. This penalty is only due to penalty from tasks which were not schedulable and were missing deadline without the system 100 having any delays. Thus, the penalty increase refers to increase in penalty of the system 100 due to more tasks missing their deadline due to run time delays. Here, FIG. 4A illustrates a plot showing performance comparison among a well-known method (say method 1), the method of present disclosure, and adaption of well-known methods with the method of present disclosure (say adapted method 1, adapted method 2) for a uniform delay distribution across all the agents. FIG. 4B illustrates a plot showing performance comparison among a well-known method (say method 1), the method of present disclosure, and adaption of well-known methods with the method of present disclosure (say adapted method 1, adapted method 2) for a delay distribution where all the agents have some amount of delay. Here, delay values are drawn from two delay distribution sets. FIG. 4C illustrates a plot showing performance comparison among a well-known method (say method 1), the method of present disclosure, and adaption of well-known methods with the method of present disclosure (say adapted method 1, adapted method 2) when the delay distribution is such that 50% of the agents experience a delay which is a randomly generated value. It is observed from FIGS. 4A through 4C that the method of present disclosure has least penalty increase consistently across different distributions as compared to the well-known method (say method 1) and the adaption of well-known methods with the method of present disclosure (say adapted method 1, adapted method 2).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of task allocation using a single solution which is not sufficient for handling various scenarios of multi-agent task allocation problems. The method of present disclosure provides a scalable solution for dynamic task scheduling and rescheduling using heterogeneous multi-agent fleet that handles tasks with multiple pickup and drop locations and dynamic execution time using the agents with heterogeneous speed in a more efficient manner, reducing indirect operating costs and increasing revenue potential while minimizing additional penalty due to run time delays that any agent may encounter.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
    receiving, via one or more hardware processors, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters;
    obtaining, via the one or more hardware processors, a first task list by sorting the set of tasks based on the corresponding predefined deadline and the corresponding predefined penalty for missing the corresponding predefined deadline;
    selecting, via the one or more hardware processors, a first task from the first task list such that the corresponding predefined penalty of the first task is maximum in comparison to the corresponding predefined penalties of one or more remaining tasks in the first task list to perform one of:
        (i) iterating the first task on the plurality of heterogeneous agents to identify a first set of agents such that the first task is schedulable on the first set of agents without missing the corresponding predefined deadline when executed from a current location to a second location through a first location, and
        (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent; or
        (a) adding the first task to a second task list when the first task is non-schedulable on the plurality of heterogeneous agents without missing the corresponding predefined deadline, wherein the second task list is a subset of the first task list;
    iteratively performing previous step for each task in the first task list to obtain a first task allocation sequence;
    scheduling, via the one or more hardware processors, each task from the second task list to the plurality of heterogeneous agents such that a minimum penalty out of the corresponding predefined penalties is incurred and a second task allocation sequence is obtained;
    detecting, via the one or more hardware processors, a delay in execution of a plurality of tasks to determine a status indicative of missing the corresponding predefined deadline or not missing the corresponding predefined deadline by corresponding agents during execution of the plurality of tasks; wherein when there are no additional deadline misses, dynamic task scheduling process proceeds without changes; and
    dynamically creating, via the one or more hardware processors, based on the status indicative of missing the corresponding predefined deadline, a new schedule by performing one of:
        (a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and swapping each of the plurality of tasks being executed by the corresponding agents missing the corresponding predefined deadline with a second task scheduled on the corresponding agents; or (i) determining whether each of the plurality of tasks being executed by the corresponding agents missing the corresponding predefined deadline is reschedulable on an agent from the plurality of heterogeneous agents that is different from the corresponding agent while incurring lesser penalty in comparison to the corresponding predefined penalty, allocating each of the plurality of tasks to the agent from the plurality of heterogeneous agents that is different from the corresponding agent, determining when the delay is detected on an agent and a task is identified as missing the corresponding predefined deadline;

calculating a penalty for missing the deadline;

checking possibility of switching task with another task on the agent such that penalty incurred is less than the corresponding predefined penalty ; and switching tasks and creating the new schedule, when there exists possibility of switching task with another task; or mapping the task identified as missing to a new agent and the new schedule is created.

2. The method of claim 1, wherein the one or more task specific parameters comprising coordinates of the first location and the second location.

3. The method of claim 1, wherein the first location is indicative of a pickup location and the second location is indicative of a drop location.

4. The method of claim 1, wherein the one or more static agent specific parameters comprising agent speed without any payload, an agent speed with payload, an actuation time to a perform a first subtask, and an actuation time to perform a second subtask.

5. The method of claim 1, wherein the one or more dynamic agent specific parameters comprising the current location and a residual energy of the agent.

6. A system, comprising:
a memory storing instructions;
one or more communication interfaces; and
one or more hardware processors coupled to the memory via the one or more communication interfaces, wherein the one or more hardware processors are configured by the instructions to:
  receive, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters;
  obtain a first task list by sorting the set of tasks based on the corresponding predefined deadline and the corresponding predefined penalty for missing the corresponding predefined deadline;
  select a first task from the first task list such that the corresponding predefined penalty of the first task is maximum in comparison to the corresponding predefined penalties of one or more remaining tasks in the first task list to perform one of:
    (i) iterating the first task on the plurality of heterogeneous agents to identify a first set of agents such that the first task is schedulable on the first set of agents without missing the corresponding predefined deadline when executed from a current location to a second location through a first location, and
    (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent; or
    (a) adding the first task to a second task list when the first task is non-schedulable on the plurality of heterogeneous agents without missing the corresponding predefined deadline, wherein the second task list is a subset of the first task list;
  iteratively perform previous step for each task in the first task list to obtain a first task allocation sequence;
  schedule each task from the second task list to the plurality of heterogeneous agents such that a minimum penalty out of the corresponding predefined penalties is incurred and a second task allocation sequence is obtained;
  detect a delay in execution of a plurality of tasks to determine a status indicative of missing the corresponding predefined deadline or not missing the corresponding predefined deadline by corresponding agents during execution of the plurality of tasks, wherein when there are no additional deadline misses, dynamic task scheduling process proceeds without changes; and
  dynamically create, based on the status indicative of missing the corresponding predefined deadline, a new schedule by performing one of:
    (a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and
      swapping each of the plurality of tasks being executed by the corresponding agents missing the corresponding predefined deadline with a second task scheduled on the corresponding agents; or
    (i) determining whether each of the plurality of tasks being executed by the corresponding agents missing the corresponding predefined deadline is reschedulable on an agent from the plurality of heterogeneous agents that is different from the corresponding agent while incurring less penalty in comparison to the corresponding predefined penalty,
      allocating each of the plurality of tasks to the agent from the plurality of heterogeneous agents that is different from the corresponding agent,
  determining when the delay is detected on an agent and a task is identified as missing the corresponding predefined deadline;

calculating a penalty for missing the deadline;

checking possibility of switching task with another task on the agent such that penalty incurred is less than the corresponding predefined penalty; and switching tasks and creating the new schedule, when there exists possibility of switching task with another task; or mapping the task identified as missing to a new agent and the new schedule is created.

7. The system of claim 6, wherein the one or more task specific parameters comprising coordinates of the first location and the second location.

8. The system of claim 6, wherein the first location is indicative of a pickup location and the second location is indicative of a drop location.

9. The system of claim 6, wherein the one or more static agent specific parameters comprising agent speed without any payload, an agent speed with payload, an actuation time to a perform a first subtask, and an actuation time to perform a second subtask.

10. The system of claim 6, wherein the one or more dynamic agent specific parameters comprising the current location and a residual energy of the agent.

11. One or more non-transitory computer readable mediums comprising one or more instructions which when executed by one or more hardware processors cause:

receiving, via one or more hardware processors, a set of tasks to be allocated to a multi-agent fleet comprising a plurality of heterogeneous agents, wherein each task from the set of tasks is characterized by an execution time of the task being performed by an agent from the plurality of heterogeneous agents, a corresponding predefined deadline and a corresponding predefined penalty for missing the corresponding predefined deadline, and wherein the execution time of the task is a function of one or more task specific parameters, one or more static agent specific parameters and one or more dynamic agent specific parameters;

obtaining, via the one or more hardware processors, a first task list by sorting the set of tasks based on the corresponding predefined deadline and the corresponding predefined penalty for missing the corresponding predefined deadline;

selecting, via the one or more hardware processors, a first task from the first task list such that the corresponding predefined penalty of the first task is maximum in comparison to the corresponding predefined penalties of one or more remaining tasks in the first task list to perform one of:

(i) iterating the first task on the plurality of heterogeneous agents to identify a first set of agents such that the first task is schedulable on the first set of agents without missing the corresponding predefined deadline when executed from a current location to a second location through a first location, and (ii) selecting an agent from the first set of agents to allocate the first task based on a minimum slack value based selection criterion, wherein the slack value is a function of an agent speed and indicates a gap between the corresponding predefined deadline of the first task and an end time of each of a plurality of tasks being executed by the selected agent; or (a) adding the first task to a second task list when the first task is non-schedulable on the plurality of heterogeneous agents without missing the corresponding predefined deadline, wherein the second task list is a subset of the first task list;

iteratively performing previous step for each task in the first task list to obtain a first task allocation sequence;

scheduling, via the one or more hardware processors, each task from the second task list to the plurality of heterogeneous agents such that a minimum penalty out of the corresponding predefined penalties is incurred and a second task allocation sequence is obtained;

detecting, via the one or more hardware processors, a delay in execution of a plurality of tasks to determine a status indicative of missing the corresponding predefined deadline or not missing the corresponding predefined deadline by corresponding agents during execution of the plurality of tasks, wherein when there are no additional deadline misses, dynamic task scheduling process proceeds without changes; and dynamically creating, via the one or more hardware processors, based on the status indicative of missing the corresponding predefined deadline, a new schedule by performing one of:

(a) determining whether each of the plurality of tasks being executed by the corresponding agents missing the corresponding predefined deadline is reschedulable at a position on the second task allocation sequence that is different from a previous position of the corresponding agents on the second task allocation sequence while incurring lesser penalty in comparison to the corresponding predefined penalty, and swapping each of the plurality of tasks being executed by the corresponding agents missing the corresponding predefined deadline with a second task scheduled on the corresponding agents; or (i) determining whether each of the plurality of tasks being executed by the corresponding agents missing the corresponding predefined deadline is reschedulable on an agent from the plurality of heterogeneous agents that is different from the corresponding agent while incurring lesser penalty in comparison to the corresponding predefined penalty, allocating each of the plurality of tasks to the agent from the plurality of heterogeneous agents that is different from the corresponding agent, determining when the delay is detected on an agent and a task is identified as missing the corresponding predefined deadline;

calculating a penalty for missing the deadline;

checking possibility of switching task with another task on the agent such that penalty incurred is less than the corresponding predefined penalty; and switching tasks and creating the new schedule, when there exists possibility of switching task with another task; or mapping the task identified as missing to a new agent and the new schedule is created.

12. The one or more non-transitory machine-readable information storage mediums of claim 11, wherein the one or more task specific parameters comprising coordinates of the first location and the second location.

13. The one or more non-transitory machine-readable information storage mediums of claim 11, wherein the first location is indicative of a pickup location and the second location is indicative of a drop location.

14. The one or more non-transitory machine-readable information storage mediums of claim 11, wherein the one or more static agent specific parameters comprising agent speed without any payload, an agent speed with payload, an actuation time to a perform a first subtask, and an actuation time to perform a second subtask.

15. The one or more non-transitory machine-readable information storage mediums of claim 11, wherein the one or more dynamic agent specific parameters comprising the current location and a residual energy of the agent.

* * * * *